United States Patent [19]

Bernstein

[11] 4,032,419
[45] June 28, 1977

[54] METHOD AND APPARATUS FOR SEPARATING URANIUM ISOTOPES

[75] Inventor: Elliot R. Bernstein, Princeton, N.J.

[73] Assignee: Research Corporation, New York, N.Y.

[22] Filed: June 11, 1975

[21] Appl. No.: 585,809

[52] U.S. Cl. .................. 204/157.1 R; 204/DIG. 11; 250/527
[51] Int. Cl.² .......................................... B01J 1/10
[58] Field of Search ......... 204/DIG. 11; 250/423 R, 250/527

[56] References Cited
OTHER PUBLICATIONS

Applied optics, vol. 11, No. 2 (Feb., 1972) pp. 354–358.
Separation Science, vol. 7, No. 4 (1972) pp. 319–329.
IBM Technical Disclosure Bulletin, vol. 17, No. 11 (April, 1975) pp. 3501–3502

*Primary Examiner*—Howard S. Williams
*Attorney, Agent, or Firm*—Darby & Darby

[57] ABSTRACT

A uranium compound in the solid phase (uranium borohydride four) is subjected to radiation of a first predetermined frequency that excites the uranium-235 isotope-bearing molecules but not the uranium-238 isotope-bearing molecules. The compound is simultaneously subjected to radiation of a second predetermined frequency which causes the excited uranium-235 isotope-bearing molecules to chemically decompose but which does not affect the uranium-238 isotope-bearing molecules. Sufficient heat is then applied to the irradiated compound in the solid phase to vaporize the non-decomposed uranium-238 isotope-bearing molecules but not the decomposed uranium-235 isotope-bearing molecules, thereby physically separating the uranium-235 isotope-bearing molecules from the uranium-238 isotope-bearing molecules.

The uranium compound sample in the solid phase is deposited or grown in an elongated tube supported within a dewar vessel having a clear optical path tail section surrounded by a coolant. Two sources of radiation are focused on the uranium compound sample. A heating element is attached to the elongated tube to vaporize the irradiated compound.

14 Claims, 1 Drawing Figure

U.S. Patent   June 28, 1977   4,032,419
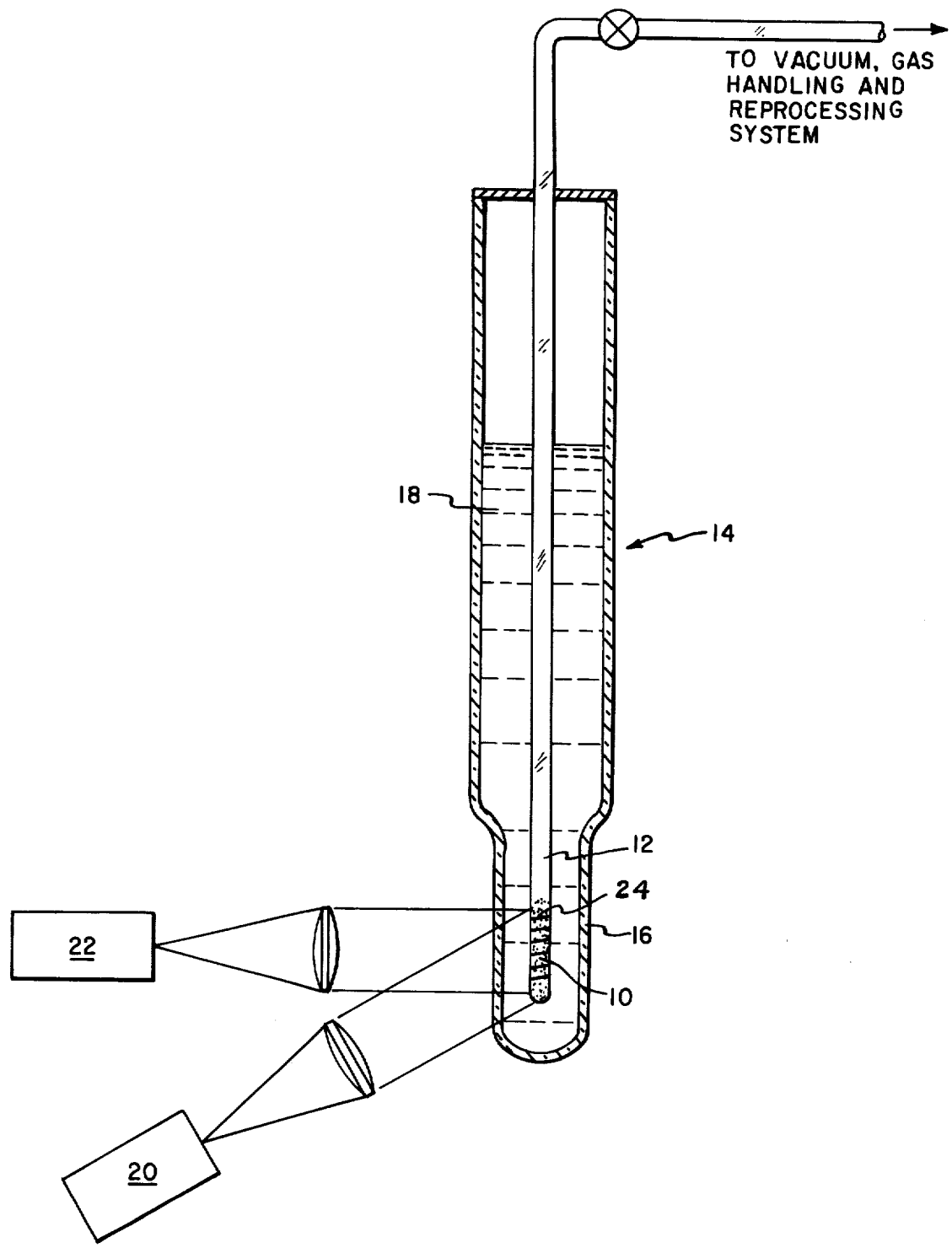
TO VACUUM, GAS HANDLING AND REPROCESSING SYSTEM

METHOD AND APPARATUS FOR SEPARATING URANIUM ISOTOPES

BACKGROUND OF THE INVENTION

This invention generally relates to a method and apparatus for separating isotopes and, particularly, a two-photon photoexcitation process and apparatus for separating uranium isotopes.

A fissionable material is one that readily undergoes fission when struck by neutrons. The only naturally available fissionable material is uranium-235, an isotope of uranium constituting less than one percent of the naturally occurring element. Almost all the rest of the natural uranium element is the uranium-238 isotope. The complete or partial separation of the isotopes of naturally occurring uranium results in a product called "enriched uranium" which has a higher than normal concentration of uranium-235 and a waste product called "depleted uranium" which has a lower than normal concentration of uranium-235. The production of enriched uranium is a vitally important process for nuclear applications.

The most commonly known methods for uranium isotope separation are the gaseous diffusion process, which is currently being used in the United States, and the gaseous centrifugation process. Both of these processes require a tremendous amount of energy in order to separate relatively small amounts of uranium isotopes and thus are extremely expensive in terms of the amount of enriched uranium produced.

A two-photon photo-excitation process for separating uranium isotopes involves subjecting uranium in the gaseous phase, either in ion form or in a molecular compound, to a source of radiation in order to excite the molecules bearing one of the uranium isotopes but not the molecules bearing the other isotope and then subjecting the excited uranium isotope molecules to further radiation to ionize or dissociate the excited uranium isotope molecules in order to achieve isotope separation. These photo-excitation processes utilize the fact that changes in the nuclear mass of a compound can shift electronic, vibrational, vibronic and rotational energy levels. When the isotopic shift places the absorption spectrum of one isotopic species at a frequency at which another isotopic species is transparent, it is possible to selectively excite the first isotopic species with a laser of sufficiently narrow line width. Photo-excitation processes such as these are disclosed in U.S. Pat. No. 3,433,087 to J. Robieux et al., U.S. Pat. No. 3,772,519 to Levy et al., and British Pat. No. 1,284,620 to Gurs.

The gaseous diffusion and centrifugation processes and all known photo-excitation processes for uranium isotope separation all have in common the fact that the sample or working medium of uranium which is subjected to diffusion or centrifugation or which is irradiated is the gaseous state or phase.

In prior photo-excitation processes for separating uranium isotopes which have used a working medium in the gaseous state, it has been necessary to operate at extremely low pressures (e.g. less than 5 torr but more typically 1 torr) in order to obtain a sharp resolution of the lines of the uranium ion or compound absorption spectra. If the pressure used is not sufficiently low, the uranium ions or molecules have a tendency to collide with one another and obliterate the distinction between lines of the absorption spectra which are representative of different energy levels. Since the pressure of a gas is directly proportional to its density, the lower the pressure the lower the density of the gaseous molecules and, consequently, the lower the yield of enriched uranium in these photo-excitation processes using a working medium in the gaseous phase. This inability to produce a large yield of the enriched isotope has been one of the major problems with these prior photo-excitation processes.

A second major problem with these prior photo-excitation processes in which a working medium in the gaseous state is irradiated is the back reactions which occur among the gaseous molecules both after the molecules bearing one of the uranium isotopes have been raised to an excited state and after these excited molecules have been ionized or dissociated. The incidence of back reactions is particularly high in the gaseous phase because of the constant motion of the molecules. The collision of any molecule with a uranium isotope-bearing molecule in an excited state may rob that isotopic molecule of its energy thus lessening the number of molecules which can be successfully ionized or dissociated in order to be able to accomplish physical separation of the uranium isotopes. Collisions which occur after the uranium isotope-bearing molecules have become ionized or dissociated cause difficulty in the physical separation or collection of the ionized or dissociated molecules. This back reaction problem of these prior photo-excitation processes also contributes to the failure of these processes to produce practical quantities of enriched uranium.

In summary, the main problem with the previous photo-excitation processes for separating uranium isotopes in which a working medium in the gaseous phase is irradiated is their inability to produce practical amounts of enriched uranium. Contributing factors to this main problem which are directly related to the use of a gaseous phase working medium are the low density of the gaseous molecules at the low pressures at which these processes must be conducted, and the back reactions which occur among the gaseous molecules which lessen the amount of molecules which are ionized or dissociated and which also lessen the amount of molecules which can be physically separated or collected.

SUMMARY OF THE INVENTION

In contrast to all previously known photo-excitation processes for separating uranium isotopes which involved the irradiation of uranium ions or a uranium compound in the gaseous phase, the method and apparatus of this invention involves the irradiation of a uranium compound in the solid phase.

There are two important advantages in irradiating a uranium compound in the solid phase in a two-photon photo-excitation isotope separation process. The first, and most dramatic, arises from the high density of molecules available in the solid phase when operating at low temperatures thereby permitting a potentially greater yield of enriched uranium than is possible when irradiating a uranium compound in the gaseous phase at low pressures. For example, the density of molecules available in the gaseous phase when operating at 5 torr at 20° C is approximately $2 \times 10^{16}$ molecules per cubic centimeter. The density of molecules available in the solid phase at atmospheric pressure at 20° C and with 5 grams per cubic centimeter is approximately $1 \times 10^{22}$ molecules per cubic centimeter. This means that the density of molecules available in the solid phase is approximately one million times greater than the density of molecules available in the gaseous state. Assuming that other conditions such as reaction rates and the like are equal, the potential yield of enriched uranium by using the method and apparatus of this invention may be a million times greater than the present potential yield from photo-excitation processes for isotope separation in which a uranium ion or compound in the gaseous phase is irradiated.

The other important advantage of irradiating a uranium compound in the solid phase is that the absorption spectra of certain uranium compounds in the solid phase exhibit well resolved, sharp, electronic, vibronic and vibrational transitions (approximately 1.0 centimeters$^{-1}$ for uranium borohydride four) which can be observed in molecular crystals at low temperatures (approximately 4° K to 20° K for uranium borohydride four).

Thus, the inability of previous photo-excitation processes to produce practical quantities of enriched uranium is overcome by the method of this invention which involves subjecting a uranium compound in the solid phase to radiation of a first predetermined frequency to excite the uranium-235 isotope-bearing molecules but not the uranium-238 isotope-bearing molecules and simultaneously subjecting the compound to a second source of radiation which causes ionization or dissociation of the uranium-235 isotope-bearing molecules and decomposition of the uranium compound containing the uranium-235 isotope-bearing molecules. Then, the undecomposed and decomposed uranium compound is merely heated to vaporize the undecomposed uranium compound so that all that remains is the decomposed uranium compound containing uranium-235 isotope-bearing molecules which may be subjected to further chemical or physical treatment in order to obtain the desired end product. The particular uranium compound which is used in the process of this invention is uranium borohydride four ($U(BH_4)_4$) either alone or in a host lattice of zirconium, hafnium or thorium borohydride four.

The absorption spectra of molecular gases include various energy levels which are identified by vibrational lines, electronic lines, vibronic lines and rotational lines. Molecular gases at low pressures have rotational lines which are sharp and well defined. However, the density of these rotational lines is high for heavy molecules such as uranium compounds so that the rotational lines superimpose upon one another thereby increasing the difficulty in ascertaining the isotopic shift thereby increasing the difficulty in ascertaining the isotopic shift for a particular rotational line.

There are no rotational lines in the absorption spectra of solids, only electronic lines, vibrational lines and vibronic lines. In order to be able to accomplish uranium isotope separation, it is necessary that the absorption spectra of the solid phase uranium compound to be irradiated exhibit sharp and well defined electronic, vibrational and/or vibronic lines such that an isotopic shift for corresponding transitions can be observed.

There are three advantages in using uranium borohydride in the solid state as the working medium for the two-photon photo-excitation isotope separation process of this invention. The first is that uranium borohydride offers the possibility of using the $(5f)^2$ electrons of a uranium four plus compound ($U^{4+}$) which permit both vibronic and electronic transitions to take place that are sharp and well resolved and which also permit both an electronic zero point and vibrational isotope effects which can be observed. The isotope effects (that is, the isotopic shift), on electronic states particularly, can be quite large because of the relative lightness of uranium borohydride.

The second advantage of using uranium borohydride in the solid state is its extremely high vapor pressure (1 millimeter at 30° C). This is the highest known vapor pressure of a $U^{4+}$ compound. This property of uranium borohydride permits it to be easily vaporized.

The third advantage of using uranium borohydride is that it provides all the necessary isotopes (boron 10, boron 11, hydrogen 1, hydrogen 2 ) To enable good uranium-235 - uranium -238 separation.

Uranium borohydride in the solid phase, either alone or in a host lattice of zirconium, hafnium or thorium borohydride, has an absorption spectrum which exhibits sharp and well defined electronic vibrational and vibronic lines (approximately 1.0 cm$^{-1}$) at low temperatures (4° K to 20° K) which exhibit an isotopic shift for corresponding energy lines of uranium-235 borohydride four and uranium-238 borohydride four.

At the present time, the only known compound whose absorption spectrum in the solid phase exhibits sufficiently well defined electronic, vibronic and vibrational lines to permit the use of the compound as a working medium in a two-photon photo-excitation uranium isotope separation process is uranium borohydride four. However, it is believed that any other uranium four plus compound whose absorption spectra in the solid phase exhibits sharp electronic, vibronic and vibrational lines and which has a high vapor pressure would be suitable for use in this process. Although such compounds are not at the present time known, it is anticipated that the investigation of the absorption spectra of various uranium compounds in the solid phase will indicate that such compounds are suitable for use in the process of this invention, and it is intended that the use of such compounds in the solid phase be included within the scope of this invention as more particularly set forth in the claims appended hereto.

Another advantage of the method of this invention is the simplicity of the apparatus which can be utilized to perform the method. The apparatus may consist of an elongated tube within which the sample of uranium borohydride may be grown or deposited. The elongated tube is supported within a dewar flask having a clear optical path tail section and which is filled with a coolant. Two radiation sources are focused on the sample and a heating element is provided to vaporize the irradiated uranium compound. Conventional vacuum, gas-handling and reprocessing apparatus may be used to reprocess the vaporized undecomposed uranium compound back into the system.

The process of this invention together with additional objects and advantages thereof will be best understood by the following description of a preferred method and embodiment of the apparatus for practicing the invention, particularly in view of the illustrative drawing setting forth a preferred embodiment of the apparatus for practicing the invention.

BRIEF DESCRIPTION OF THE DRAWING

The drawing illustrates a diagrammatic view of a dewar vessel within which the uranium compound is irradiated and the radiation sources.

Description of a Preferred Method and Embodiment

The first step in the process of this invention involves growing crystals of uranium borohydride. A method of growing such crystals has been described in Volume 59, Journal of Chemical Physics, pages 2105-2122 (1973), a cope of which is attached hereto as Appendix A as part of this application. The article describes the growing of crystals of uranium borohydride four alone and in either hafnium, zirconium or thorium borohydride four. Basically, the process involves growing crystals of uranium borohydride four from the gaseous phase.

Referring to the drawing, the uranium borohydride four sample crystals 10 may be either grown or deposited in the bottom of an elongated tube 12, the cross section of which could be round of square. The tube 12 can be composed of Pyrex or quartz. The tube 12 may be supported within a dewar vessel 14 having a clear optical path tail section 16 or windows through which the required radiation may pass. The dewar vessel 14 may be composed of a low temperature metal, Pyrex or quartz.

The dewar vessel 14 may be filled with a coolant such as a cryogenic liquid 18 which may be a rare gas such as helium, neon, argon or xenon or a simple molecule such as oxygen, nitrogen, methane or the like. As shown in the drawing, the coolant surrounds the sample crystals 10. Instead of using a cryogenic liquid to cool the sample crystals during irradiation, a constant temperature solution or a mechanical or thermodynamic expansion refrigerator may be used.

The uranium borohydride crystals 10 in the reaction vessel are then subjected to simultaneous radiation by two radiation sources 20 and 22. The first radiation source 20, a laser, excites the uranium-235 borohydride four molecules, but not the uranium-238 borohydride four molecules, to a higher energy state, and the second radiation source 22 ionizes or dissociates the uranium-235 borohydride four molecules but does not affect the uranium-238 borohydride four molecules.

Either of two types of lasers can be used to radiate the uranium borohydride four crystals in the solid phase in order to raise the uranium-235 borohydride four molecules to an excited state. They are the following: an optical parametric oscillator (OPO) pumped by either neodymium (Nd), ruby or argon laser. The OPO can be either lithium iodate ($LiIO_3$) or lityium niobate ($LiNbO_3$). The lithium iodate would be matched with the argon to produce a continuous wave laser. The lithium niobate can be matched with the ruby or neodymium to produce a pulsed laser. These lasers are broadly tunable between 5,000 and 12,000 wave numbers and the area of primary interest in irradiating uranium borohydride four in the solid phase is approximately 5,000 wave numbers.

In table II of the article attached hereto as Appendix A, a number of the infrared electronic, vibronic or vibrational transitions which show an isotope effect in uranium borohydride are set forth. FIGS. 2–7 of the article illustrate portions of the absorption spectrum of uranium borohydride four. (Although not essential to practicing the method of this invention, additional background information regarding the absorption spectra of uranium borohydride four in the solid phase may be found in a thesis by T. A. Keiderling entitled "Electronic and Vibrational Spectroscopy of Uranium Borohydride" which is available from University Microfilms, Ann Arbor, Mich., under the call number 74,17465. )

One of the infrared electronics, vibronic or vibrational transitions set forth in the above referred to table is selected and the first radiation source or laser beam 20 is tuned to the appropriate wavelength. The uranium borohydride four in the reaction vessel is exposed to the source of radiation and the molecules of uranium-235 borohydride four absorb a first photon which raises these uranium-235 molecules to an excited state.

Simultaneously, a second radiation source 22 which may be a second laser beam or a xenon or mercury high pressure lamp or any other sutiable source of radiation which is filtered with acetone or some other appropriate filter and which has a wavelength about 3,000 Angstroms is directed at the sample in the reaction vessel. For example, a xenon lamp with a 15-centimeter cell acetone filter could be used. This causes a second photon to be absorbed by the excited uranium-235 to borohydride four molecules which results in ionization or dissociation of the excited molecules. These uranium-235 borohydride four molecules which are ionized or dissociated decompose to uranium-235 borohydride three (235-U(BH$_4$)$_3$) or uranium-235 boride three (235-UB$_3$) in the solid phase.

The two radiation sources 20 and 22 may be placed at an angle of 90° with respect to one another.

The second or higher frequency radiation source 22 may be on at all times during the process. Although the duration of the first radiation source 20, the laser, depends on the particular electronic, vibronic or vibrational absorption line, the type of laser used and the frequency emitted by the second radiation source, the first radiation source may be on for periods of approximately five minutes.

Since the vapor pressure of the decomposed product (uranium-235 borohydride three or uranium-235 boride four) is much lower than the vapor pressure of the undecomposed product (uranium-238 borohydride four), the sample crystals 10 in the reaction vessel are heated with a nichrome wire heater 24 or any other suitable heater to approximately 30°–40° so that the undecomposed product vaporizes and is pumped out of the reaction vessel (as indicated by arrow in drawing) by any sutiable means and is available for recycling in the process. Alternatively, the dewar vessel or the elongated tube can be removed from the system and the crystals in the tube can be warmed by an appropriate heater. The uranium-235 borohydride four or uranium-235 boride three which is left behind in the reaction vessel is then removed and the separated uranium 235 isotopes are available for further chemical treatment and collection.

Various other features and advantages not specifically enumerated will undoubtely occur to those versed in the art, as will many variations and modifications of the preferred process illustrated, all of which may be achieved without departing from the spirit and scope of the invention as defined by the following claims.

What is claimed is

1. A method for separating the uranium-235 isotope-bearing molecules having a first energy excitation level from the uranium-238 isotope-bearing molecules having a second energy excitation level higher or lower than said first excitation energy level in a uranium compound comprising the steps of irradiating said uranium compound in the crystalline form of the solid phase at a first predetermined frequency which excites the uranium-235 isotope-bearing molecules but not the uranium-238 isotope-bearing molecules, and irradiating said uranium compound in the crystalline form of the solid phase with a second radiation source at a second predetermined frequency which dissociates or ionizes the uranium-235 isotope-bearing molecules from said uranium compound in the crystalline form of the solid phase but does not ionize or dissociate the uranium-238 isotope-bearing molecules from said uranium compound.

2. The mehod of claim 1 further comprising the step of applying heat to said irradiated uranium compound in the crystalline form of the solid phase in order to vaporize the uranium-238 isotope-bearing molecules but not the uranium-235 isotope-bearing molecules, thereby separating the uranium-235 isotope-bearing molecules from the uranium-238 isotope-bearing molecules.

3. The method according to claim 1 wherein said compound has electronic and vibrational and/or vibronic lines in the crystalline form of the solid phase having a width of approximately $1.0$ cm$^{-1}$.

4. The method according to claim 1 wherein said compound is uranium borohydride four ($U(BH_4)_4$).

5. The method according to claim 1 wherein said compound is uranium borohydride four ($U(BH_{44})$) in zirconium, hafnium or thorium borohydride four.

6. The method according to claim 1, wherein said first predetermined frequency corresponds to an electronic and vibrational and/or vibronic absorption line of the uranium 235 isotopes-bearing molecules in said uranium compound in the crystalline form of the solid phase but not to the same absorption line of the uranium-238 isotope-bearing molecules of said uranium compound in the crystalline form of the solid phase.

7. A method for separating the uranium-235 isotope-bearing molecules having a first energy excitation level from the uranium-238 isotope-bearing molecules having a second energy excitation level comprising the steps of irradiating uranium borohydride four in the crystalline form of the solid phase with a first radiation source at a first predetermined frequency which excites the uranium-235 isotope-bearing molecules but not the uranium-238 isotope-bearing molecules, simultaneously irradiating uranium borohydride four in the crystalline form of the solid phase with a second radiation source at a second predetermined frequency which dissociates or ionizes the uranium-235 isotope-bearing molecules so that the portion of the uranium borohydride four compound composed of uranium-235 isotope-bearing molecules decomposes to uranium borohydride three or uranium boride three.

8. The method recited in claim 7 further comprising the step of heating the irradiated uranium borohydride compound to approximately 30°–40° C in order to vaporize the uranium borohydride four.

9. Apparatus for separating the uranium 235 isotope-bearing molecules in a uranium compound in the solid phase from the uranium-238 isotope-bearing molecules comprising:

an optically clear tube within which said uranium compound in the solid phase is to be deposited.

a first radiation source adapted to be focused on said uranium compound within said tube for irradiating said uranium compound in the solid phase, a second radiation source spaced from said first radiation and adapted to be focused on said uranium compound within said tube for irradiating said uranium compound in the solid phase and decomposing said uranium-235 isotope-bearing molecules, means for heating said irradiated uranium compound is the solid phase in order to vaporize said undecomposed uranium- 238 isotope-bearing molecules.

10. The apparatus recited in claim 9, further comprising a dewar vessel within which said tube is supported, said vessel adapted to be filled with a coolant.

11. The apparatus recited in claim 9, further comprising means for pumping said vaporized uranium compound from said tube and means for processing and recycling said vaporized uranium compound.

12. The apparatus recited in claim 9, said first radiation source comprising an optical parametric oscillator pumped by either a neodymium, ruby or argon laser.

13. The apparatus recited in claim 9, said second radiation source comprising a xenon lamp having an acetone filler.

14. The apparatus recited in claim 9, said heating means comprising a nichrome wire about said tube.

* * * * *